United States Patent [19]
Dowben et al.

[11] Patent Number: 6,077,617
[45] Date of Patent: Jun. 20, 2000

[54] RARE-EARTH BORIDE THIN FILM SYSTEM

[75] Inventors: Peter A. Dowben; Zenchen Zhong; David J. Sellmyer, all of Lincoln, Nebr.

[73] Assignee: Board of Regents of the University of Nebraska, Lincoln, Nebr.

[21] Appl. No.: 09/432,427

[22] Filed: Nov. 2, 1999

Related U.S. Application Data

[63] Continuation-in-part of application No. 09/140,734, Aug. 26, 1998, Pat. No. 6,025,038.

[51] Int. Cl.[7] ............................... B32B 9/00; B32B 19/00
[52] U.S. Cl. ........................ 428/688; 427/282; 427/331; 427/430.1; 427/555; 427/558; 427/581; 427/596; 428/704
[58] Field of Search .................................. 427/555, 558, 427/581, 596, 282, 331, 470.1; 428/688, 704

[56] References Cited

U.S. PATENT DOCUMENTS

| | | |
|---|---|---|
| 2,639,399 | 5/1953 | Lafferty . |
| 3,399,321 | 8/1968 | Kauer . |
| 3,484,263 | 12/1969 | Kushihashi et al. ................... 117/33.3 |
| 4,393,326 | 7/1983 | Kamegaya et al. ..................... 313/582 |
| 4,464,416 | 8/1984 | Liepins ...................................... 427/40 |
| 4,511,595 | 4/1985 | Inoue .................................... 427/43.1 |
| 4,599,076 | 7/1986 | Yokono et al. ........................... 445/24 |
| 4,600,397 | 7/1986 | Kawakabo et al. ......................... 445/6 |
| 4,727,287 | 2/1988 | Alda et al. .............................. 313/582 |
| 5,059,449 | 10/1991 | van der Putten et al. ............. 427/53.1 |
| 5,159,238 | 10/1992 | Koiwa et al. ............................ 313/582 |
| 5,260,108 | 11/1993 | Braren et al. ........................... 427/581 |
| 5,277,932 | 1/1994 | Spencer ................................. 427/248.1 |

OTHER PUBLICATIONS

"Thermionic Emission Properties of $LaB_6$ and $CeB_6$ in Connection with Their Surface States, Examination by XPS, Auger Spectroscopy and the Kelvin Method", Berrada et al., Surface Science 72, 177 (1978). (No month avail.).

"Microcircuits by Electron Beam", Broers et., Sci. Am. 227, 34 (1972); (No month avail.).

"Lanthanum Hexaboride Electron Emitter", Ahmed et al., J. App. Phys. 43, 2185 (1972); (No month avail.).

"Electron Beam Fabrication", Miller et al., Solid State Technology, 16, 25, (Jul. 1973).

"Evaluation of a $LaB_6$ Cathode Electron Gun", Verhoeven et al., J. Phys. E, Scientific Instruments, vol. 9 (1976); (No month avail.).

"Field Emission Pattern of $LaB_6$–Single Crystal Tip", Shimizu et al., J. App. Phys., vol. 14, No. 7, 1089 (1975); (No month avail.).

"Highly Stable Single–Crystal $LaB_6$ Cathode for Conventional Electron Microprobe Instruments", Shimizu et al., J. Vac. Sci. Technol., 15(3), 922 (1978); (No month avail.).

"Chemical Vapor Deposition of Metal Borides, 4: The Application of Polyhedral Boron Vapor Deposition Formation of Gadnolinium Boride Thin–Film Materials", Kher et al., Appl. Organ. Chem., vol. 10, 197 (1996); (No month avail.).

"The Deposition of Metallic and Non–Metallic Thin Films Through the Use of Boron Clusters", Zhang, Kim, Dowben & Spencer, Chemical Perspectives of Microelectronic Materials III, Ed. by C.R. Abernathy et al., Mat. Res. Soc. Symp. vol. 131, Proc. 282, 185 (1993); (No month avail.).

"Laser–Induced Selective Copper Deposition on Polyimides and Semiconductors", Hwang, Kher, Spencer & Dowben, Mat. Res. Symp. Proc., vol. 282 (1983); (No month avail.).

(List continued on next page.)

*Primary Examiner*—Bernard Pianalto
*Attorney, Agent, or Firm*—James D. Welch

[57] ABSTRACT

Disclosed is a system made by a method for depositing rare-earth boride onto the surface of a substrate which is submerged in an organic solution of borane and a rare-earth halide. Application of electromagnetic radiation, preferably in the visible wavelength range, through a mask near the surface of the submerged substrate, drives the formation and deposition of rare-earth boride onto a substrate in desired patterns.

28 Claims, 2 Drawing Sheets

OTHER PUBLICATIONS

"Material Deposition", Bauerle, Chemical Processing with Lasers, ED. Queisser, Springer Verlag (1986); (No month avail.).

Surface Processing Leading to Carbon Contamination of Photochemically Deposited Copper Films:, Houle et al., J. Vac. Sci Technol., A 4(6) 2452 (Nov./Dec. 1986).

"Photochemical Generation and Deposition of Copper from a Gas Phase Precursor", Jones et al., Appl. Phys. Lett., 46, 97 (Jan. 1985).

"Laser Chemical Vapor Deposition of Copper", Houle et al., Appl. Phys. Lett., 46(2), 204 (Jan. 1985).

"LCVD of Copper: Deposition Rates and Deposit Shapes", Moylan et al., Appl. Phys. Lett. A 40, 1 (1986); (No month avail.).

"High–Speed Laser Chemical Vapor Deposition of Copper: A Search for Optimum Conditions", Markwalder et al., J. Appl. Phys., 65(6), 2470 (Mar. 1989).

"Laser Enhanced Electroplating and Maskless Pattern Generation", von Gutfeld et al., Appl. Phys. Lett., 35(9) (1979); (No month avail.).

"Laser–Enhanced Jet Plating: A Method of High–Speed Maskless Patterning", von Gutfeld et al., Appl. Phys. Lett., 43(9), 876, (Nov. 1983).

"High–Speed Electroplating of Copper Using the Laser–Jet Technique", von Gutfeld et al., Appl. Phys. Lett. 46(10) (May 1985).

"Investigation of Laser–Enhanced Electroplating Mechanisms", Puippe et al., J. Electrochem. Soc., vol. 128, No. 12, 2539 (Dec. 1981).

"Laser Induced Copper Plating", Al–Sufi et al., J. Appl. Phys. 54(6), 3629 (Jun. 1983).

"Laser–Induced Decomposition of Organometallic Compounds", Gerassimov et al., XII International Quantum Electronics Conference, (1982); (No month avail.).

"Photoelectrochemical Deposition of Microscopic Metal Film Patterns on Si and GaAs", Micheels et al., Appl. Phys. Lett., 39(5), 418 (Sep. 1981).

"Structural and Electrical Properties of Crystalline (1–x) $Ta_2O_5$–$xAl_2O_3$ Thin Films Fabricated by Metalorganic Solution Deposition Technique"et al., Joshi et al., Appl. Phys. Lett. 71(10), 1341 (Sep. 1997).

"Metalorganic Solution Deposition Technique", Joshi et al., Appl. Phys. Lett. 70(9), 1080 (Mar. 1997).

"Solution Deposition and Hetroepitaxial Crystalization of $LaNiO_3$ Electrodes for Integrated Ferroelectric Devices", Cho et al., Appl. Phys. Lett. 71(20), 3013 (Nov. 1997).

"Designing of Organometallics for Vapor Phase Metallization of Plastics", Boag & Dowben, Metallized Plastics 4: Fundamental and Applied Aspects, ED Mittal, Marcel Decker, New York (1997). (No month avail.).

"Effect of Textured $LaNiO_3$ Electrode on the Fatigue Improvement of $Pb(Z_{0.53}Ti_{0.47})O_3$ Thin Films", Chen et al., Appl. Phys. Lett. 68(10), 1430 (Mar. 1996).

"Preparation of (100)–Oriented Metallic $LaNiO_3$ Thin Films On Si Substrates by Radio Frequency Magnetron Sputtering for the Growth of Textured $Pb(Zr_{0.53}Ti_{0.47})O_3$", Yang et al., Appl. Phys. Lett. 66(20), 2643 (May 1995).

"Deposition of Thin Metal and Metal Silicide Films from the Decomposition of Organometallic Compounds", Dowben et al., Mat. Sci. Eng. B2, 297 (1989). (No month avail.).

"Chemical Vapor Deposition Precursor Chemistry. 3. Formation and Characterization of Crystalline Nickel Boride Thin Films from the Cluster–Assisted Deposition of Polyhedral Borane Compounds", Kher et al., Chem. Mater., 4, 538 (1992); (No month avail.).

"Synthesis of Cerium and Gadolinium Borides Using Boron Cage Compounds as a Boron Source", Itoh et al., Mat. Res. Bul. 22, 1259 (1987). (No month avail.).

RARE-EARTH BORIDE THIN FILM SYSTEM

This Application is a CIP of Allowed application Ser. No. 09/140,734 filed Aug. 26, 1998, U.S. Pat. No. 6,025,038.

TECHNICAL FIELD

The present invention relates to substrate systems, and more particularly is a system resulting from the practice of a method for depositing rare-earth borides onto the surface of a substrate which is submerged in an organic solution of borane and a rare-earth halide, said deposition being driven by application of electromagnetic radiation.

BACKGROUND

A particularly relevant, non-limiting, application of the present invention is in the fabrication of a variety of electron emitting electrodes and gas-discharge plasma display systems which comprise cathode(s) and electrically excitable gas(es). Fabrication of plasma display systems requires that cathode material(s) which can emit electrons be caused to be present in desired patterns on substrates which are situated in close proximity to said electrically excitable gas(es). Preferably said cathode material(s) should have a low work function such that electrons can be easily emitted therefrom in use, and said electrically excitable gas(es) should be capable of providing desired, (eg. visible), electromagnetic wavelengths when electrical discharge is caused to occur therein by application of electric potential to closely situated cathodes.

Approaches to improving gas-discharge plasma displays include:

a. development and use of improved cathode material(s);

b. development and practice of improved cathode material deposition; and c. development and use of improved electrically excitable gas(es).

While the development and use of improved electrically excitable gas(es) is a very viable and worthy approach to improving operation of gas discharge display systems, the present invention is focused on development and use of improved cathode material(s) and development and improved procedures of cathode material(s) deposition onto substrates, which procedures can be adapted to fabrication of plasma discharge displays.

In view of the focus of the present invention, it is noted that various approaches to fabricating substrates which have cathode material(s) present thereon in desired patterns, have been investigated by previous researchers. Such techniques include:

a. screen printing;

b. plasma spray deposition;

c. vacuum deposition by sputtering or evaporation;

d. cluster-assisted deposition;

e. light-induced deposition from solution.

The present invention was arrived at by experimentation in the area of light-induced deposition of cathode material(s) from solution, (preferably organic solvent based), and the present invention is found in practice of a method and the results of the practice thereof.

A search of Patents focused upon gas-discharge plasma displays provided a Patent to Kolwa et al., U.S. Pat. No. 5,159,238, which describes a gas discharge panel with a plurality of electrically conductive oxide cathode electrodes formed from, for instance, lanthanum, chromite, lanthanum calcium chromite, aluminum doped zinc oxide, or antimony-doped tin oxide.

Continuing, and of somewhat more relevance, a Patent to Lafferty, U.S. Pat. No. 2,639,399, and a Patent to Kauer, U.S. Pat. No., 3,399,321 disclose that rare-earth hexaborides have low work functions and are very suitable to application in electron emitter and filament applications. A Patent to Yokono et al., U.S. Pat. No. 4,599,076 describes production of a discharge display involving the cathode forming steps of applying a paste prepared by mixing $LaB_6$ powder with alkali glass powder in proportion of 20–40% by weight to a base electrode, then burning the paste and then activating the paste by gas discharge with large current after an exhaustion step. A similar process leading to a similar result is also described in U.S. Pat. No. 4,600,397 to Kawakubo et al. A Patent to Kamegaya et al., U.S. Pat. No. 4,393,326 describes a gas discharge panel with an electrode comprised of a metal layer, (eg. Fe and Ni), and a metal compound layer, (eg. alkaline earth metal oxide or sulphide and rare-earth metal hexaboride), which are formed by a plasma spray technique. Another Patent which describes use of a rare-earth hexaboride such as $LaB_6$ in forming cathodes in a plasma discharge display is U.S. Pat. No. 4,727,287 to Alda et al. Another Patent, U.S. Pat. No. 5,277,932 to Spencer, describes application of chemical vapor deposition techniques to deposit metal boride films onto substrates utilizing metal borane cluster compound as a precursor. While this method is successful, it does not lend itself well to either selective area depositions, or to depositions in large scale area manufacturing where substrates can have dimensions of several inches.

The above Patents show that the use of low work function rare-earth hexaborides to form cathodes in electron emitter, filament and gas plasma displays is not new, and that various techniques exist for forming such rare-earth containing cathodes. However, no known Patent describes the formation of rare-earth containing cathodes by a method comprising light-induced deposition (LISD) from solution. This is even more so where the solution is organic solvent based. It is noted that organic-based solvent based solutions, (eg. those containing methanol, nitriles or amides), as opposed to aqueous solutions, absorb wavelengths in the ultraviolet and are therefore often overlooked in the practice of light-induced deposition from solution.

Additional searching performed with an eye to identifying the application of light-induced deposition from solution in formation of rare-earth containing electrodes provided very little. A Patent to Liepins, U.S. Pat. No. 4,464,416 describes a procedure which is purported to be applicable to forming a metallic coating on a polymeric substrate, comprising contacting the polymeric substrate with a fluid containing a metal compound at a temperature below 150 degrees centigrade for a time sufficient for the metal to be sorbed into the substrate, and then subjecting the substrate to a low pressure plasma. A perhaps somewhat more relevant Patent is U.S. Pat. No. 3,484,263 to Kushihashi et al. in which a process for forming a layer of semi-transparent gold on the surface of glass is described as comprising the steps of containing a water-soluable gold salt and a reducing agent in contact with said glass while subjecting said glass to short wavelength rays in the range of 250 to 500 nanometers, with the improvement being that the solution is maintained at a temperature of not more than 10 degrees centigrade. Another Patent, U.S. Pat. No. 4,511,595 to Inoue, describes the deposition of a metal to a substrate from a typically flowing solution, wherein a laser beam is directed onto the substrate over a localized area, to activate an interface between said localized area and said solution. A Patent to Braren et al., U.S. Pat. No. 5,260,108 describes deposition of a metal such as palladium onto a substrate such as a polyimide, silicon dioxide, tantalum oxide or polyethylene terephthalate by contacting the substrate surface with a solution of the metal, and then exposing the surface of the substrate to laser radiation characterized by a wavelength absorbable by the substrate and a power density and fluence effective to release electrons to promote deposition of the metal onto the substrate without thermal activation of the substrate or the solution. Finally, a Patent to van der Putten et al., U.S. Pat. No. 5,059,449 describes depositing a nobel metal such as platinum from a salt solution thereof, onto a substrate which can be an insulator, semiconductor or conductor, by use of a laser beam. The solution is described as consisting essentially of a solvent selected from the group consisting of ammonia, a cyclohexanel and an amine, and typical metals which can be deposited are described as Pd, Pt, Rh, Ir, Ru and Ag. Application of the laser through masking to define areas of metal deposition is also described.

Articles of which the inventors are aware include:

A paper which describes the low work function of rare-earth metal borides is titled "Thermionic Emission Properties of $LaB_6$ and $CeB_6$ In Connection With Their Surface States, Examination By XPS, Auger Spectroscopy And The Kelvin Method", Berrada et al., Surface Science 72, 177 (1978).

Application of rare-earth metal borides in thermionic emitters is discussed in:

"Microcircuits By Electron Beam", Broers et., Sci. Am. 227, 34 (1972);

"Lanthanum Hexaboride Electron Emitter", Ahmed et al., J. App. Phys. 43, 2185 (1972);

"Electron Beam Fabrication", Miller et al., Solid State Technology, 16, 25 (July 1973);

"Evaluation of a $LaB_6$ Cathode Electron Gun", Verhoeven et al., J. Phys. E, Scientific Instruments, Vol. 9 (1976);

"Field Emission Pattern Of $LaB_6$-Single Crystal Tip", Shimizu et al., J. App. Phys., Vol. 14, No. 7, 1089 (1975);

"Highly Stable Single-Crystal $LaB_6$ Cathode For Conventional Electron Microprobe Instruments", Shimizu et al., J. Vac. Sci. Technol., 15(3), 922 (1978);

Articles which describe reaction of nido-decaborane and metal chlorides and subsequent chemical vapor deposition (CVD) of gadolinium hexaboride are:

"Chemical Vapor Deposition Of Metal Borides, 4: The Application Of Polyhedral Boron Vapor Deposition Formation Of Gadnolinium Boride Thin-Film Materials", Kher et al., Appl. Organ. Chem., Vol. 10, 297 (1996); and the previously cited Patent, U.S. Pat. No. 5,277,932 to Spencer also discusses this topic.

Similar rare-earth boride deposition, (where gadolinium was not the rare-earth involved), is discussed in:

"The Deposition Of Metallic And Non-Metallic Thin Films Through The Use Of Boron Clusters", Zhang, Kim, Dowben & Spencer, Chemical Perspectives of Microelectronic Materials III, Ed. by C. R. Abernathy et al., Mat. Res. Soc. Symp. Vol. 131, Proc. 282, 185 (1993);

"Metallized Plastics 4: Fundamentals and Applied Aspects", Ed. Mittal et al., Mercel Dekker Inc., New York (1997).

Selective area deposition of copper metal films from solution is described in:

"Laser-Induced Selective Copper Deposition On Polyimides And Semiconductors", Hwang, Kher, Spencer & Dowben, Mat. Res. Symp. Proc., Vol. 282 (1983);

"Material Deposition", Bauerle, Chemical Processing with Lasers", ED. Queisser, Springer Verlag (1986);

"Surface Processing Leading To Carbon Contamination Of Photochemically Deposited Copper Films:, Houle et al., J. Vac. Sci Technol., A 4(6) 2452 (November/December 1986);

"Photochemical Generation And Deposition Of Copper From A Gas Phase Precursor", Jones et al., Appl. Phys. Lett., 46, 97 (January 1985);

"Laser Chemical Vapor Deposition Of Copper", Houle et al., Appl. Phys. Lett., 46(2), 204 (January 1985);

"LCVD Of Copper: Deposition Rates And Deposit Shapes", Moylan et al., Appl. Phys. Lett. A 40, 1 (1986);

"High-Speed Laser Chemical Vapor Deposition Of Copper: A Search For Optimum Conditions", Markwalder et al., J. Appl. Phys., 65(6), 2470 (March 1989);

"Laser Enhanced Electroplating And Maskless Pattern Generation", von Gutfeld et al., Appl. Phys. Lett., 35(9) (1979);

"Laser-Enhanced Jet Plating: A Method of High-Speed Maskless Patterning", von Gutfeld et al., Appl. Phys. Lett., 43(9), 876, (November 1983);

"High-Speed Electroplating Of Copper Using The Laser-Jet Technique", von Gutfeld et al., Appl. Phys. Lett. 46(10) (May 1985);

"Investigation Of Laser-Enhanced Electroplating Mechanisms", Puippe et al., J. Electrochem. Soc., Vol. 128, No. 12, 2539 (December 1981);

"Laser Induced Copper Plating", Al-Sufi et al., J. Appl. Phys. 54(6), 3629 (June 1983);

"Laser-Induced Decomposition Of Organometallic Compounds", Gerassimov et al., XII International Quantum Electronics Conference, (1982);

"Photoelectrochemical Deposition Of Microscopic Metal Film Patterns On Si and GaAs", Micheels et al., Appl. Phys. Lett., 39(5), 418 (September 1981).

Selective area deposition of complex compound material films from solution is described in:

"Structural And Electrical Properties Of Crystalline $(1-x)Ta_2O_5-xAl_2O_3$ Thin Films Fabricated By Metalorganic Solution Deposition Technique"et al., Joshi et al., Appl. Phys. Lett. 71(10), 1341 (September 1997);

"Metalorganic Solution Deposition Technique", Joshi et al., Appl. Phys. Lett. 70(9), 1080 (March 1997).

A reference which describes a laser induced solution deposition process which involved copper chloride ($Cu_2Cl_2$) and nido-decaborane is:

"Solution Deposition And Hetroepitaxial Crystalization Of $LaNiO_3$ Electrodes For Integrated Ferroelectric Devices", Cho et al., Appl. Phys. Lett. 71(20), 3013 (November 1997);

It is noted that Laser Induced Solution Deposition (LISD) requirements (eg. transparent solvent/solute mixture and solid surface area which acts as a dipole that has a large dielectric response. An article which makes clear that similar requirements apply where selective area chemical vapor deposition is practiced is:

"Designing Of Organometallics For Vapor Phase Metallization Of Plastics", Boag & Dowben, Metallized Plastics 4: Fundamental and Applied Aspects, ED Mittal, Marcel Decker, New York (1997).

Deposition of electrode material (eg. $LaNiO_3$) on substrates to which it does have a good lattice match is described in:

"Effect Of Textured $LaNiO_3$ Electrode On The Fatigue Improvement Of $Pb(Zr_{0.53}Ti_{0.47})O_3$ Thin Films", Chen et al., Appl. Phys. Lett. 68(10), 1430 (March 1996);

"Preparation of (100)-Oriented Metallic $LaNiO_3$ Thin Films On Si Substrates By Radio Frequency Magnetron Sputtering For The Growth Of Textured $Pb(Zr_{0.53}Ti_{0.47})O_3$", Yang et al., Appl. Phys. Lett. 66(20), 2643 (May 1995);

A reference which describes the results of metal deposition which is influenced by nucleation centers is:

"Deposition Of Thin Metal and Metal Silicide Films From The Decomposition Of Organometallic Compounds", Dowben et al., Mat. Sci. Eng. B2, 297 (1989).

A reference which describes vacuum reactor deposition of nickel boride is:

"Chemical Vapor Deposition Precursor Chemistry. 3. Formation And Characterization Of Crystalline Nickel Boride Thin Films From The Cluster-Assisted Deposition Of Polyhedral Borane Compounds", Kher et al., Chem. Mater., 4, 538 (1992);

A reference which describes fabrication of bulk gadolinium borides (an amorphous boron) as a result of thermolysis of a molecular precursor $Gd_2(B_{10}H_{10})_3$ is:

"Synthesis Of Cerium And Gadolinium Borides Using Boron Cage Compounds As A Boron Source", Itoh et al., Mat. Res. Bul. 22, 1259 (1987).

Even in view of the large number of references, there remains need for additional, simple and efficient, techniques for selective area laser induced deposition of rare-earth borides onto substrates.

DISCLOSURE OF THE INVENTION

The present invention is primarily a system which results from practicing a method of depositing rare-earth boride, (eg. hexaboride), onto the surface of a substrate. Typical practice of the method begins with the dissolving borane and at least one rare-earth halide in an organic solvent, followed by providing and placing a substrate into said solution, so that a surface of said substrate is submerged but accessible by electromagnetic radiation. Next, a source of electromagnetic radiation is caused to expose the surface of said substrate to electromagnetic radiation, through said solution of borane and at least one rare-earth halide in said organic solvent. It is believed that as a result, at least one rare-earth halide in the vicinity of said substrate surface is fragmented into free halide and free rare-earth components and said free halide fractures said borane. Components of said fractured borane then combine with the free rare-earth to form rare-earth boride which deposits on said surface of said substrate.

The organic solvent is preferably comprised of at least one selection from the group consisting of: (methanol, THF, hexane, ether, benzene, a nitrile and an amide).

While not limiting, the substrate can be made of sodium glass. It should be appreciated in particular, that a deposited rare-earth boride need not be lattice matched to a substrate to achieve a very good, textured, rare-earth boride film deposition thereupon. That is, the deposited rare-earth borides appear to be at least substantially thermodynamically stable and thereby do not require a crystal template to effect formation thereof.

The source of electromagnetic radiation used to expose the surface of said substrate to electromagnetic radiation can be a laser, or a source of essentially white light which is passed through filtering means to provide favored wavelengths, (which are in the visible range where hv is nominally 2.4 eV). It is noted that use of wavelengths in the visible range greatly diminishes the problem of wavelength absorbtion, which can be very significant where organic solvents, and non-visible range wavelengths, are utilized. It is also noted that a favored source of electromagnetic radiation in the experimental work performed by the inventors to date is an Argon Ion Laser (I-90 Coherent).

Favored practice is to deposit rare-earth boride onto the surface of a substrate in patterns which are affected by exposing the surface of said substrate to electromagnetic radiation through an electromagnetic mask placed between said source of electromagnetic radiation and the surface of said substrate.

While most experimental work to date has been done utilizing Gadolinium (Gd), essentially any rare-earth halide can be utilized in practice of the present invention, (eg. Sc, Y, La, Ce, Pr, Nd, Pm, Sm, Eu, Gd, Tb, Dy, Ho, Er, Tm, Yb, and Lu), and a preferred, but not limiting halide is chloride. In addition, it is noted that a preferred end result is deposition of rare-earth hexaboride on the surface of a substrate.

An exemplary method of depositing $GdB_x$ onto the surface of a substrate to form a present invention system, comprises the steps of:

a. disolving $B_{10}H_{14}$ and said $GdCl_3$ in an organic solvent comprising methanol;

b. providing and placing a substrate in said solution of $B_{10}H_{14}$ and said $GdCl_3$ in said organic solvent comprising methanol, so that a surface of said substrate is submerged, but accessible by electromagnetic radiation through said solution of $B_{10}H_{14}$ and said $GdCl_3$ in said organic solvent which includes at least one selection from the group consisting of: (methanol, THF, hexane, ether, benzene, nitrile and amine);

c. providing a source of electromagnetic radiation and exposing the surface/vicinity of the surface of said substrate to electromagnetic radiation through said solution of $B_{10}H_{14}$ and said $GdCl_3$ in said organic solvent comprising methanol, from said provided source of electromagnetic radiation;

such that said $GdCl_3$ in the vicinity of said substrate surface is fragmented into free chloride and free Gd components, with the result being that said free chlorine fractures said $B_{10}H_{14}$, with the further result being that components of said fractured $B_{10}H_{14}$ combine with Gd to form $GdB_x+(B_{10-x}H_yCl+yHCl)$, which $GdB_x$ deposits on said surface of said substrate.

A more general method of depositing rare-earth boride onto the surface of a substrate to form a present invention system, comprises the steps of:

a. dissolving borane and at least one rare-earth halide in an organic solvent;

b. providing and placing a substrate in said solution of borane and at least one rare-earth halide in said organic solvent, so that a surface of said substrate is submerged but accessible by electromagnetic radiation;

c. providing a source of electromagnetic radiation and exposing the vicinity of the surface of said substrate to electromagnetic radiation through said solution of borane and at least one rare earth halide in said organic solvent, from said provided source of electromagnetic radiation;

such that said at least one rare-earth halide deposits on said surface of said substrate.

A present invention system is preferrably formed by, in the method step of dissolving borane and at least one rare-earth halide in an organic solvent, providing an organic solvent which includes at least one selection from the group consisting of:

methanol; THF; hexane; ether; benzene; nitriles and amines;

and the at least one rare-earth halide is selected from the group consisting of:

Sc; Y; La; Ce; Pr; Nd; Pm; Sm; Eu; Gd; Tb; Dy; Ho; Er; Tm; Yb; and Lu.

A preferred, but not limiting substrate utilized in the method of formation of present invention system is made of sodium glass.

As mentioned above, the method step of exposing the the vicinity of the surface of said substrate to electromagnetic radiation, preferably involves use of a laser, and the method step of exposing the the vicinity of the surface of said substrate to electromagnetic radiation involves use of essentially white light which is passed through filtering means to provide favored wavelengths to provide favored wavelengths are in the visible range where hv is nominally 2.4 eV.

Preferred present invention systems provide for fabrication of patterend rare-earth boride deposition by, in the method step of exposing the surface/vicinity of the surface of said substrate to electromagnetic radiation, providing an electromagnetic radiation mask between the source of electromagnetic radiation and the substrate.

A present invention system is preferably, but not exclusively, formed by, in the method step of dissolving borane and at least one rare-earth halide in an organic solvent, utilizing chloride as the halide.

A preferred present invention system comprises rare-earth hexaborides which deposit(s) on the surface of said substrate.

The present invention will be better understood by reference to the Detailed Description Section of this Disclosure in conjunction with appropriate reference to the Drawings.

SUMMARY OF THE INVENTION

It is therefore a primary objective of the present invention to teach a system made by a method for depositing rare-earth boride onto the surface of a substrate which is submerged in an organic solution of borane and a rare-earth halide, via application of electromagnetic radiation to the surface/vicinity of the surface of the submerged substrate.

It is another objective of the present invention to identify at least one selection from the group consisting of: (methanol, THF, hexane, ether, benzene, nitrile and amine), as an appropriate organic solvent for use in practicing the method of the present invention.

It is yet another objective of the present invention to identify sodium glass as an appropriate substrate for use in practicing the method of the present invention.

It is another objective purpose yet of the present invention to identify appropriate sources of electromagnetic radiation used to expose the surface of said substrate to electromagnetic radiation can be a laser, or a source of essentially white light which is passed through filtering means to provide favored wavelengths, which are in the visible range where hv is nominally 2.4 ev.

It is another objective of the present invention to disclose that favored practice is to deposit rare-earth boride onto the surface of a substrate in patterns which are effected by exposing the surface of said substrate to electromagnetic radiation through an electromagnetic mask placed between said source of electromagnetic radiation and the surface of said substrate.

It is another objective of the present invention to disclose that the method of the present invention can be practiced with any of the rare-earths: (Sc, Y, La, Ce, Pr, Nd, Pm, Sm, Eu, Gd, Tb, Dy, Ho, Er, Tm, Yb, and Lu).

It is yet another objective of the present invention to disclose that a preferred halide for use in practice of the present invention is chloride.

It is another objective yet of the present invention to disclose that hexaboride is the preferred boride for deposition on the surface of a substrate.

DETAILED DESCRIPTION

Figure 1:
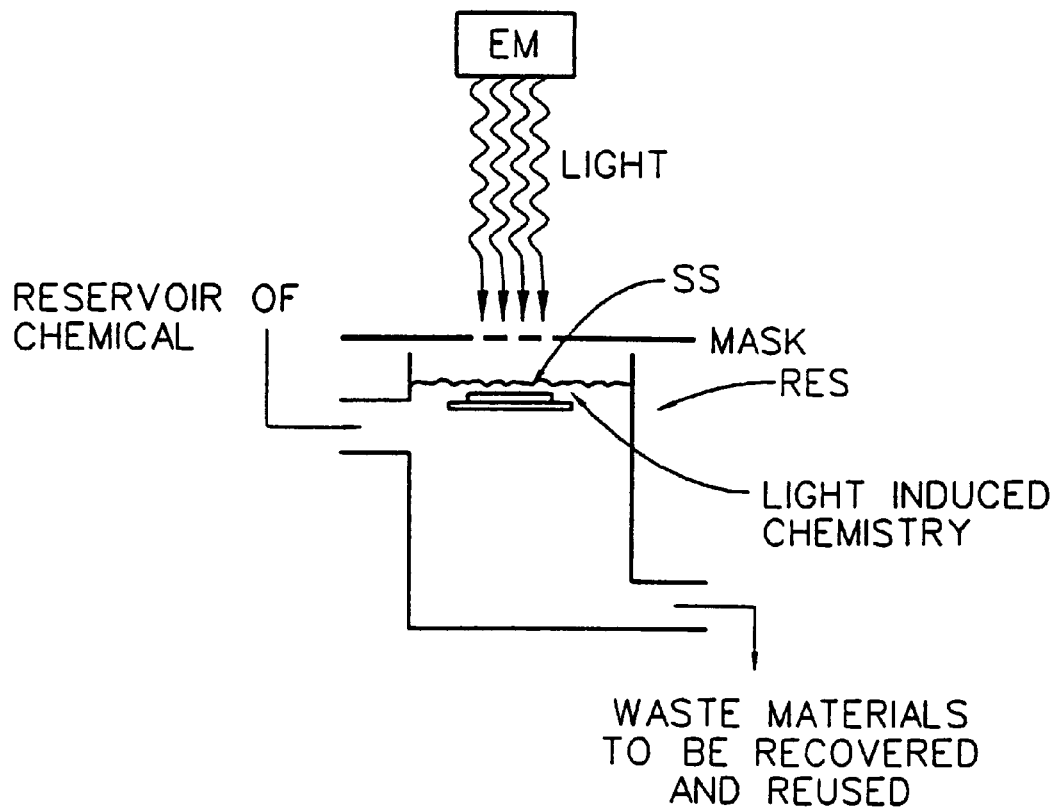
FIG. 1 demonstrates a system for practicing the present invention.

Turning now to the drawings, FIG. 1 demonstrates a system for practicing the present invention. In particular a reservoir of chemicals (RES) with a substrate surface (SS) therein is shown with a source of electromagnetic radiation (EM) positioned to provide "light" through a Mask. Means for entering and recovering waste materials for reuse are demonstrated.

Figure 2:
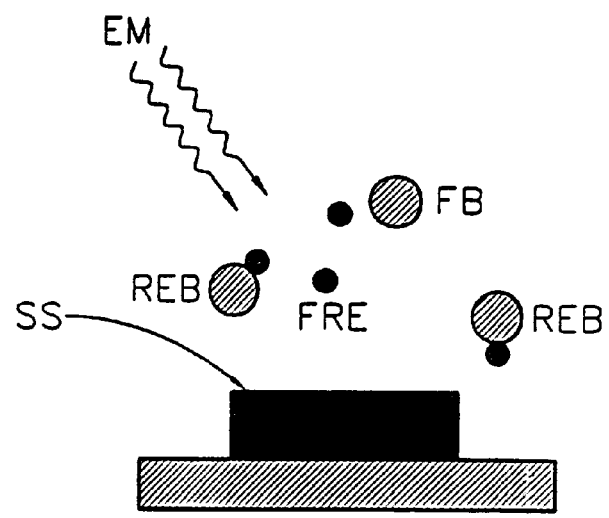
FIG. 2 demonstrates expected interaction between electromagnetic radiation (EM) and a rare-earth halide, which, in the vicinity of said substrate surface (SS) is fragmented into free halide and free rare-earth (FRE) components, with the result believed to be that said free halide fractures said borane, with the further result that components of said fractured borane (FB) combine with free rare earth (FRE) to form rare-earth boride (REB) which deposits on said surface (SS) of said substrate.

FIG. 2 demonstrates interaction between electromagnetic radiation (EM) and a rare-earth halide in the vicinity of said substrate surface (SS). Said rare-earth halide is functionally shown as being fragmented into free halide and free rare-earth (FRE) components, with the further result believed to be that said free halide fractures said borane, such that components of said fractured borane (FB) combine with free rare earth (FRE) to form rare-earth boride (REB) which deposits on said substrate surface (SS).

Experimental depositions performed to date by the inventors utilized solutions containing various mixtures of methanol, hexane, tetrahydrofuran (THF), ether, benzene, nitrile and amine, and electromagnetic radiation was provided from an Argon Ion Laser (I-90 Coherent) source. Electromagnetic radiation from the Argon Laser provided wavelengths in the ultraviolet, (eg. 300–400 mW, 333 nm–363 nm) and in the visible (5–7 W, 514 nm).

Figure 3A:
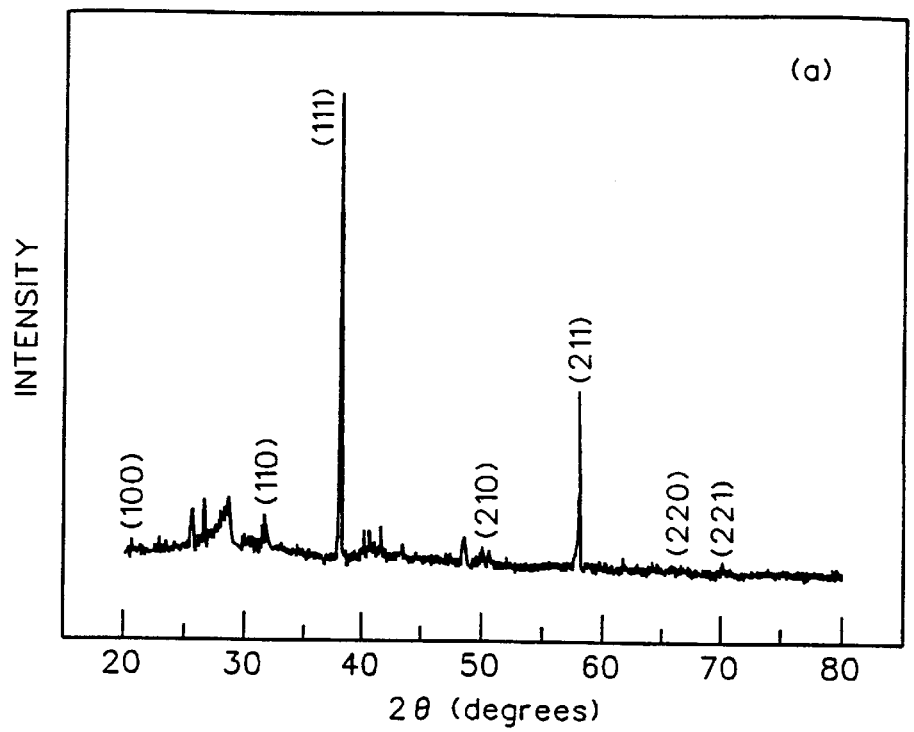
FIG. 3a shows X-ray Diffraction Patterns from Gadolinium Hexaboride ($GdB_6$) deposited onto a glass substrate.

FIG. 3a shows X-ray Diffraction Patterns from Gadolinium Hexaboride ($GdB_6$) deposited onto a glass substrate. The investigated Gadolinium Hexaboride ($GdB_6$) was deposited utilizing gadolinium chloride and decaborane as precursors in a solvent consisting of 10–120 mmol THF (36–48%), 10–100 mmol hexane (36–48%), 2–25 mmol ether (3–28%) and 3–15 mmol (<1%) methanol). The electromagnetic radiation was in the visible range (eg. hv is nominally 2.4 ev). XES measurements show no chlorine in the deposited films and the Diffraction Patterns are clearly associated with the presence of Gadolinium Hexaboride ($GdB_6$). The prominence of the (111) diffraction line, as seen in FIG. 3a, clearly indicates that the films grown from solution are textured. It is noted that films of Gadolinium Hexaboride ($GdB_6$) grown in a vacuum reactor typically show far less texturing. In particular it is noted that FIG. 3a shows an essential absence of an X-ray diffraction (221) peak. This is in direct constrast to, for instance, the significant presence of a (221) X-ray diffraction peak in the plot shown in FIG. 3 of the previously cited Kher et al. paper which describes ($GdB_6$) grown in a vacuum reactor. (Note, the Kher et al. paper is identified in the Background Section of this Specification and is found in Applied Organometallic Chemistry, Vol. 10, P. (297–304), (1996)). It is believed that textured films provide improved electrode fatigue properties. The Gadolinium Hexaboride (GdB$_6$) films were grown on non-crystaline sodium glass, such as used in DC plasma discharge display systems and it is emphasized that no lattice matching between said Gadolinium Hexaboride (GdB$_6$) and the sodium glass was present.

Figure 3B:
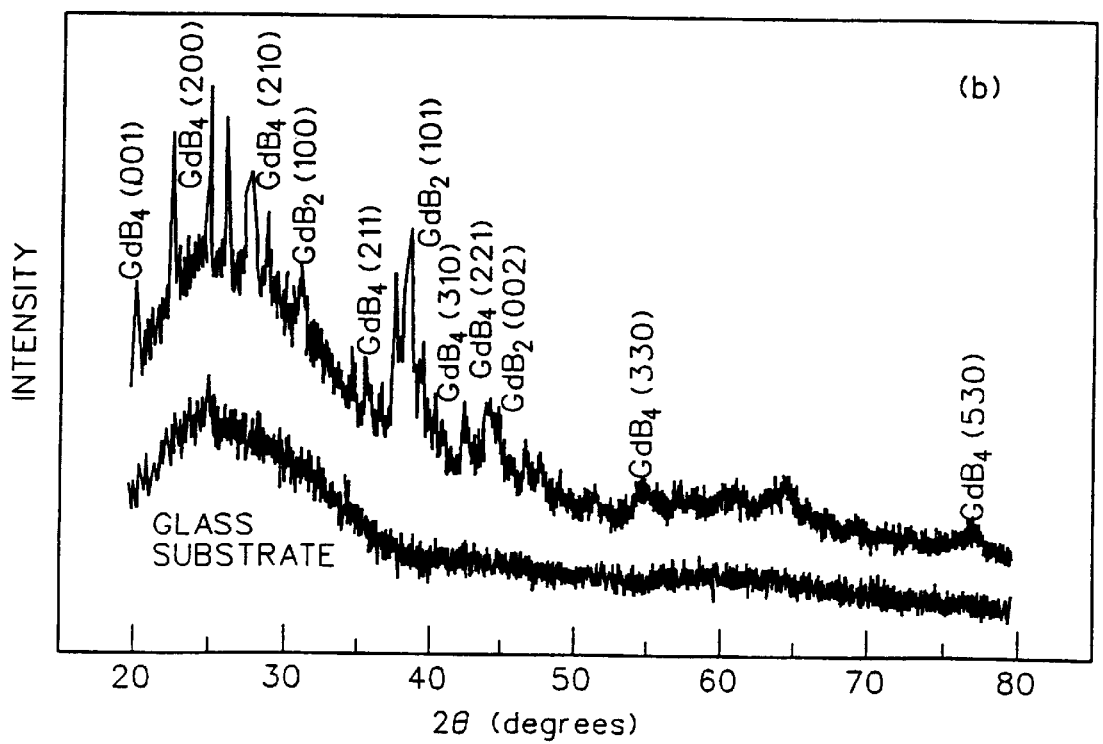
FIG. 3b shows X-ray Diffraction Patterns from Gadolinium sub-borides ($GdB_4$) and ($GdB_2$) on a glass substrate, along with the similar result from the glass substrate prior to deposition.

FIG. 3b shows X-ray Diffraction Patterns from Gadolinium sub-borides (GdB4) and (GdB2) on a glass substrate, along with the similar results from the glass substrate prior to deposition. These films showed trace amounts of chlorine present which is consistent with the presence of the identified Gadolinium sub-borides. Similar Lanthanum borides have also been fabricated.

It is again noted that (LISD) deposited films which are deposited utilizing visible range wavelength electromagnetic radiation are typically more uniform that films deposited utilizing more conventional precesses, (eg. CVD).

Additional films were deposited utilizing electromagnetic radiation in the ultraviolet. Where this was done the methanol content of the solution was reduced to less than 1%. The resulting films showed characteristics of nucleation sites. (It is noted that methanol is a necessary solvent component for the dissolution of gadolinium chloride, and that the content of methanol must be reduced where ultraviolet wavelengths are utilized as methanol absorbs uv wavelengths).

The results of the present laser initiated deposition from solution procedure suggests that the deposition chemistry is similar to that associated with use of high temperature vacuum reactor. It is believed that the chemical reaction for the gadolinium borides during deposition from solution can be written as:

$$GdCl_3 + B_{10}H_{14} \rightarrow GdB_x + B_{10-x}H_yCl + yHCl.$$

It is believed that a key chemical intermediate is of the form:

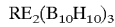

$$RE_2(B_{10}H_{10})_3$$

(where "RE"=Rare Earth), and is a part of the thin film deposition process. The fabrication of the bulk gadolinium borides (and amorphous boron), has been undertaken from the thermolysis of said molecular Gd$_2$(B$_{10}$H$_{10}$)$_3$ precursor. The dominant gadolinium borides in this pyrolysis reaction are GdB$_4$ and GdB$_6$, as is also the case in the solution deposition reported here.

Laser-induced deposition of gadolinium borides from solution has been shown to be effective and simple. The mechanism of Laser Induced Solution Deposition (LISD) clearly resembles that of Chemical Vapor Deposition (CVD) in the gas phase. However, unlike gas phase deposition, (eg. CVD and PECVD), deposition from solution is compatible with thin film formation on thermally sensitive substrates because of the large thermal sink of the solvent/solute mixture.

It is noted that the mechanism of inducing deposition material reducing electrons at the surface of a substrate onto which a rare-earth boride is to be deposited, such as described in the previously referenced Patent to Inoue, (U.S. Pat. No. 4,511,595), which describes the deposition of a metal onto a substrate from a typically flowing solution, wherein a laser beam is directed onto the substrate over a localized area, to activate an interface between said localized area and said solution, might play a role similar to that in the case where a metal is reduced onto the surface of a substrate.

It should also be appreciated that the (LISD) technique permits one undertake recovery of unused metals and source compounds, and volatility, toxicity and safety issues, common to (CVD) processes, are diminished. Further, the fact that present invention rare-earth boride film deposition occurs best where visible range wavelengths are utilized in the deposition process, means that the present invention process for deposition of rare-earth hexaborides onto substrates can more easily be adapted to industrial scale environments where conventional visible light sources are commonly available.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

We claim:

1. A system made by a method of depositing rare-earth boride onto the surface of a substrate, said rare-earth boride being characterized by a (221) X-ray diffraction peak magnitude between substantially absent and less than half the magnitude of a (111) X-ray diffraction peak, said method comprising, in any functional order, the steps of:

a. dissolving borane and at least one rare-earth halide in an organic solvent;

b. providing and placing a substrate in said solution of borane and at least one rare-earth halide in said organic solvent, so that a surface of said substrate is submerged but accessible by electromagnetic radiation;

c. providing a source of electromagnetic radiation and exposing the surface/vicinity of the surface of said substrate to electromagnetic radiation through said solution of borane and at least one rare earth halide in said organic solvent, from said provided source of electromagnetic radiation;

such that said at least one rare-earth halide in the vicinity of said substrate surface is fragmented into free halide and free rare-earth components, with the result being that said free halide fractures said borane, with the further result being that components of said fractured borane combine with free rare-earth to form rare-earth boride which deposits on said surface of said substrate.

2. A system as in claim 1, in which the method step of dissolving borane and at least one rare-earth halide in an organic solvent includes providing an organic solvent which includes at least one selection from the group consisting of: methanol; THF; hexane; ether; benzene; nitriles and amines.

3. A system as in claim 1, in which the method step of providing and placing a substrate in said solution of borane and at least one rare-earth halide in said organic solvent involves a substrate made of sodium glass.

4. A system as in claim 1, in which the method step of exposing the the vicinity of the surface of said substrate to electromagnetic radiation involves use of a laser.

5. A system as in claim 4, in which the favored wavelengths are in the visible range where hv is nominally 2.4 eV.

6. A system as in claim 1, in which the method step of exposing the the vicinity of the surface of said substrate to electromagnetic radiation involves use of essentially white light which is passed through filtering means to provide favored wavelengths.

7. A system as in claim 6, in which the favored wavelengths are in the visible range where hv is nominally 2.4 eV.

8. A system as in claim 1, in which the method step of exposing the vicinity of the surface of said substrate to electromagnetic radiation involves providing and placing an electromagnetic radiation mask means between said source of electromagnetic radiation and the surface of said substrate.

9. A system as in claim 1, in which the method step of dissolving borane and at least one rare-earth halide in an organic solvent involves at least one rare-earth selected from the group consisting of:

Sc; Y; La; Ce; Pr; Nd; Pm; Sm; Eu; Gd; Tb; Dy; Ho; Er; Tm; Yb; and Lu.

10. A system as in claim 1, in which the method step of dissolving borane and at least one rare-earth halide in an organic solvent involves chloride as the halide.

11. A system as in claim 1, in which the method step of exposing the surface of said substrate to electromagnetic radiation from a provided source of electromagnetic radiation causes formation of rare-earth hexaborides which deposit(s) on the surface of said substrate.

12. A system made by a method of depositing $GdB_x$ onto the surface of a substrate, said $GdB_x$ being characterized by a (221) X-ray diffraction peak magnitude between substantially absent and less than half the magnitude of a (111) X-ray diffraction peak, said method comprising, in any functional order, the steps of:
   a. dissolving $B_{10}H_{14}$ and said $GdCl_3$ in an organic solvent comprising methanol;
   b. providing and placing a substrate in said solution of $B_{10}H_{14}$ and said $GdCl_3$ in said organic solvent comprising methanol, so that a surface of said substrate is submerged, but accessible by electromagnetic radiation through said solution of $B_{10}H_{14}$ and said $GdCl_3$ in said organic solvent which includes at least one selection from the group consisting of:
      methanol; THF; hexane and ether;
   c. providing a source of electromagnetic radiation and exposing the vicinity of the surface of said substrate to electromagnetic radiation through said solution of $B_{10}H_{14}$ and said $GdCl_3$ in said organic solvent comprising methanol, from said provided source of electromagnetic radiation;
such that said $GdCl_3$ in the vicinity of said substrate surface is fragmented into free chloride and free Gd components, with the result being that said free chlorine fractures said $B_{10}H_{14}$, with the further result being that components of said fractured $B_{10}H_{14}$ combine with Gd to form $GdB_x+(B_{10-x}H_yCl+yHCl)$, which $GdB_x$ deposits on said surface of said substrate.

13. A system as in claim 12, in which the method step of providing and placing a substrate in said solution of borane and at least one rare-earth halide in said organic solvent involves a substrate made of sodium glass.

14. A system as in claim 12, in which the method step of exposing the vicinity of the surface of said substrate to electromagnetic radiation involves use of a laser.

15. A system as in claim 12, in which the method step of exposing the vicinity of the surface of said substrate to electromagnetic radiation involves use of essentially white light which is passed through filtering means to provide favored wavelengths.

16. A system as in claim 15, in which the favored wavelengths are in the visible range where hv is nominally 2.4 eV.

17. A system as in claim 12, in which the favored wavelengths are in the visible range where hv is nominally 2.4 eV.

18. A system as in claim 12, in which the method step of exposing the surface/vicinity of the surface of said substrate to electromagnetic radiation involves providing and placing an electromagnetic mask between said source of electromagnetic radiation and the surface of said substrate.

19. A system as in claim 12, in which the method step of exposing the surface/vicinity of the surface of said substrate to electromagnetic radiation from a provided source of electromagnetic radiation causes formation of rare-earth hexaborides which deposit(s) on the surface of said substrate.

20. A system made by a method of depositing rare-earth boride onto the surface of a substrate, said rare-earth boride being characterized by a (221) X-ray diffraction peak magnitude between substantially absent and less than half the magnitude of a (111) X-ray diffraction peak, said method comprising, in any functional order, the steps of:
   a. dissolving borane and at least one rare-earth halide in an organic solvent;
   b. providing and placing a substrate in said solution of borane and at least one rare-earth halide in said organic solvent, so that a surface of said substrate is submerged but accessible by electromagnetic radiation;
   c. providing a source of electromagnetic radiation and exposing the surface/vicinity of the surface of said substrate to electromagnetic radiation through said solution of borane and at least one rare earth halide in said organic solvent, from said provided source of electromagnetic radiation;
such that rare-earth boride deposits onto the surface of said substrate.

21. A system as in claim 20, in which the method step of exposing the surface/vicinity of the surface of said substrate to electromagnetic radiation involves providing and placing an electromagnetic mask between said source of electromagnetic radiation and the surface of said substrate so that said rare-earth boride deposits onto said substrate in a pattern directed by said mask.

22. A system as in claim 20, in which the method step of exposing the surface/vicinity of the surface of said substrate to electromagnetic radiation from a provided source of electromagnetic radiation causes formation of rare-earth hexaborides which deposit(s) on the surface of said substrate.

23. A system comprising a rare-earth boride in functional combination with the surface of a substrate, said rare-earth boride being non-latice matched with said substrate, said rare-earth boride being characterized by a (221) X-ray diffraction peak magnitude between substantially absent and less than half the magnitude of a (111) X-ray diffraction peak.

24. A system as in claim 23 in which said rare-earth boride is formed by a method of depositing rare-earth boride onto the surface of a substrate, said method comprising, in any functional order, the steps of:
   a. dissolving borane and at least one rare-earth halide in an organic solvent;
   b. providing and placing a substrate in said solution of borane and at least one rare-earth halide in said organic solvent, so that a surface of said substrate is submerged but accessible by electromagnetic radiation;
   c. providing a source of electromagnetic radiation and exposing the surface/vicinity of the surface of said substrate to electromagnetic radiation through said solution of borane and at least one rare earth halide in said organic solvent, from said provided source of electromagnetic radiation;
such that rare-earth boride deposits onto the surface of said substrate.

25. A system comprising a rare-earth boride in functional combination with the surface of a substrate as in claim 23, in which said rare-earth boride is a rare-earth hexaboride.

26. A system comprising a rare-earth boride in functional combination with the surface of a substrate, said rare-earth boride being characterized by a (221) X-ray diffraction peak magnitude between substantially absent and less than half the magnitude of a (111) X-ray diffraction peak, said rare-earth boride being present in a pattern, rather than being of an essentially uniform thickness over an area of said substrate surface.

27. A system as in claim 26 in which said rare-earth boride is formed by a method of depositing rare-earth boride onto the surface of a substrate, said method comprising, in any functional order, the steps of:

a. dissolving borane and at least one rare-earth halide in an organic solvent;

b. providing and placing a substrate in said solution of borane and at least one rare-earth halide in said organic solvent, so that a surface of said substrate is submerged but accessible by electromagnetic radiation;

c. providing a source of electromagnetic radiation;

d. providing a patterned electromagnetic radiation mask between said source of electromagnetic radiation and said surface of said substrate;

and exposing the surface/vicinity of the surface of said substrate to electromagnetic radiation from said provided source of electromagnetic radiation, through said solution of borane and at least one rare earth halide in said organic solvent, and through said patterned electromagnetic radiation mask;

such that rare-earth boride deposits onto the surface of said substrate where said patterned electromagnetic radiation mask allows electromagnetic radiation to pass therethrough.

28. A system comprising a rare-earth boride in functional combination with the surface of a substrate as in claim 24, in which said rare-earth boride is a rare-earth hexaboride.

* * * * *

UNITED STATES PATENT AND TRADEMARK OFFICE
CERTIFICATE OF CORRECTION

PATENT NO.       : 6,077,617
APPLICATION NO.  : 09/432427
DATED            : June 20, 2000
INVENTOR(S)      : Dowben et al.

It is certified that error appears in the above-identified patent and that said Letters Patent is hereby corrected as shown below:

Column 1 at line 13 insert the following phrase, --This invention was made with government support under grants DMR9802126 awarded by United States National Science Foundation, N00014-97-1-1073 awarded by the United States Navy/Office of Naval Research, and F49620-98-1-0463 awarded by the United States Air Force/AFOSR. The government has certain rights in the invention.--

Signed and Sealed this

Nineteenth Day of February, 2008

JON W. DUDAS
*Director of the United States Patent and Trademark Office*